United States Patent
Pacheco et al.

(10) Patent No.: US 10,059,455 B2
(45) Date of Patent: Aug. 28, 2018

(54) CABIN ATTENDANT SEAT LEGREST WITH AN EXTENDABLE FOOTREST

(71) Applicant: AMI Industries, Inc., Colorado Springs, CO (US)

(72) Inventors: Chad R. Pacheco, Colorado Springs, CO (US); Kyler Marutzky, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 77 days.

(21) Appl. No.: 15/335,140

(22) Filed: Oct. 26, 2016

(65) Prior Publication Data
US 2018/0111692 A1 Apr. 26, 2018

(51) Int. Cl.
*A47C 4/52* (2006.01)
*A47C 31/00* (2006.01)
*B64D 11/06* (2006.01)

(52) U.S. Cl.
CPC ...... *B64D 11/0643* (2014.12); *B64D 11/0691* (2014.12)

(58) Field of Classification Search
CPC .......... B64D 11/0643; B64D 11/0691; B64D 11/064; B64D 11/0605; B64D 11/0627; B64D 11/0639; B64D 11/0646; A47C 1/126; A47C 4/00; A47C 4/52; A47C 9/06
USPC ............. 297/183.1, 354.13, 423.21–423.26, 297/423.28, 423.34, 423.36
See application file for complete search history.

(56) References Cited

U.S. PATENT DOCUMENTS

| | | | |
|---|---|---|---|
| 636,725 A | 11/1899 | Healy | |
| 668,268 A | 2/1901 | Streit | |
| 2,583,372 A | 1/1952 | Hall | |
| 5,449,221 A | 9/1995 | Stander | |
| 6,517,160 B2 | 2/2003 | Marcantoni | |
| 6,652,033 B2 | 11/2003 | Satoh | |
| 6,773,074 B2 * | 8/2004 | Flory | B60N 2/995 297/423.34 |
| 6,916,069 B2 * | 7/2005 | Bauer | A47C 1/0352 297/423.3 |
| 7,121,627 B2 | 10/2006 | Gaikwad et al. | |
| 7,201,451 B2 | 4/2007 | Baumann | |
| 8,434,825 B2 | 5/2013 | Wesselink | |
| 8,444,225 B2 * | 5/2013 | Behe | B64D 11/06 297/330 |
| 8,602,499 B2 * | 12/2013 | Driessen | B60N 2/4495 297/423.36 |
| 8,882,034 B2 | 11/2014 | McKeever | |
| 9,352,674 B2 | 5/2016 | Suhre et al. | |
| 9,446,849 B1 | 9/2016 | Pinkal | |
| 2003/0209933 A1 * | 11/2003 | Flory | B60N 2/995 297/423.36 |
| 2014/0166808 A1 | 6/2014 | Boenning et al. | |

OTHER PUBLICATIONS

Pacheco et al., U.S. Appl. No. 15/368,234, filed Dec. 2, 2016 entitled "Suspension Recline System".

\* cited by examiner

*Primary Examiner* — Mark R Wendell
(74) *Attorney, Agent, or Firm* — Snell & Wilmer L.L.P.

(57) ABSTRACT

A legrest for a stowable seat may comprise a legrest chassis comprising a first end and a second end, the first end being located opposite the second end, a footrest opening disposed in the second end, and an extendable footrest configured to at least one of extend from and retract into the footrest opening. The legrest may be configured to be coupled to the stowable seat at the first end.

20 Claims, 16 Drawing Sheets

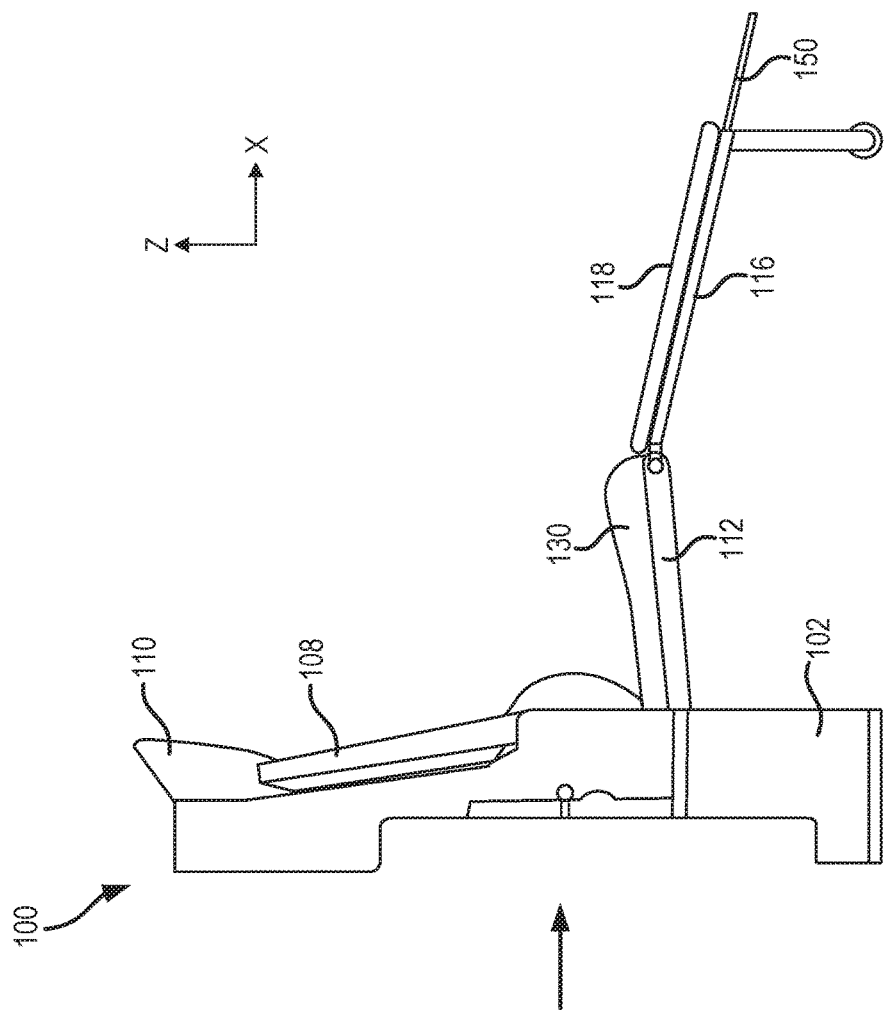
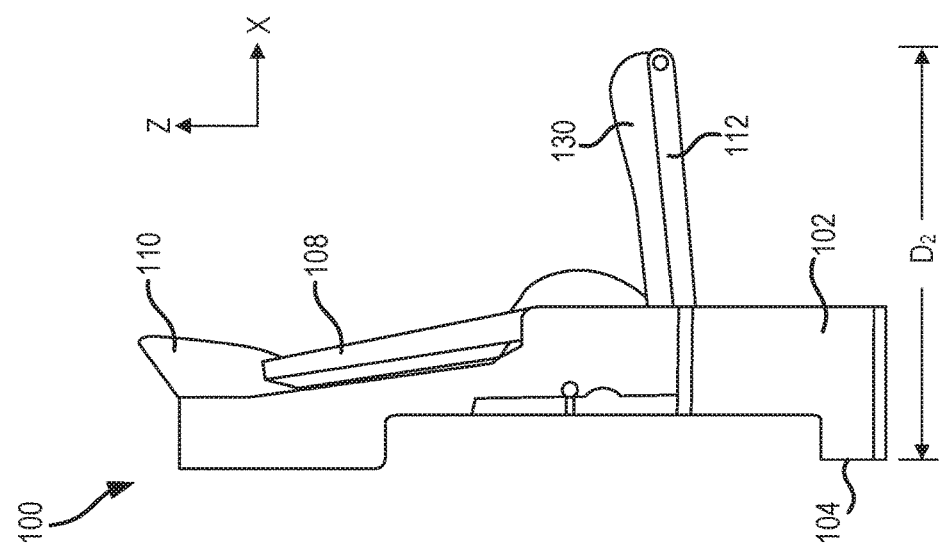

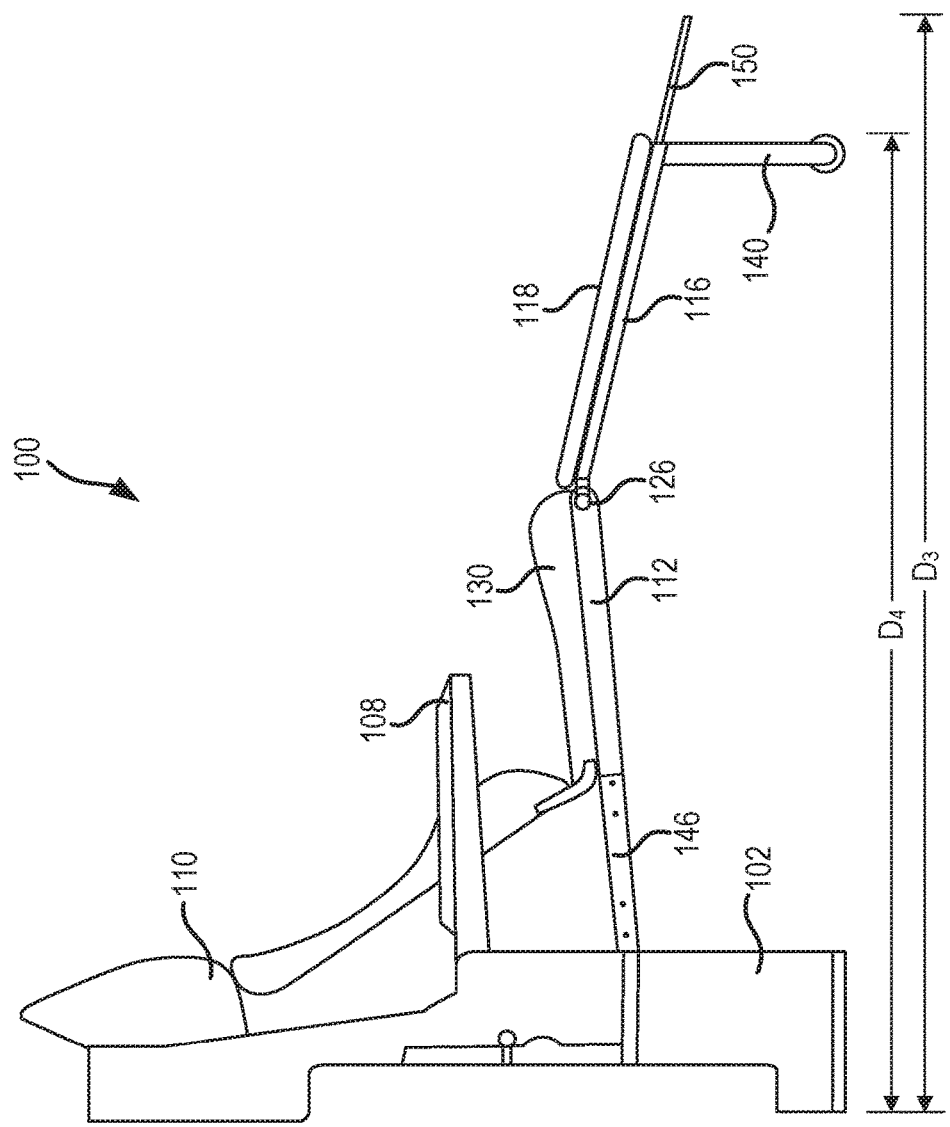

CABIN ATTENDANT SEAT LEGREST WITH AN EXTENDABLE FOOTREST

FIELD OF INVENTION

The present disclosure relates to stowable aircraft seats, and, more specifically, to a stowable seat legrest with a footrest.

BACKGROUND

Aircraft cabin seats are used for flight attendant safety and comfort during taxi, takeoff, landing, and inflight rest periods. Useable volumetric space on an aircraft may be too limited for large, bulky seats. Additionally, seats should not hinder ingress and egress for passengers in the event of an emergency. Aircraft cabin seats may be used for long periods of time and longer duration flights. An uncomfortable cabin seat may cause pain and/or discomfort for the crew on an aircraft.

SUMMARY

A legrest for a stowable seat is disclosed herein, in accordance with various embodiments. A legrest for a stowable seat may comprise a legrest chassis comprising a first end and a second end, the first end being located opposite the second end, a footrest opening disposed in the second end, and an extendable footrest configured to at least one of extend from and retract into the footrest opening, wherein the first end of the legrest is configured to be coupled to the stowable seat.

In various embodiments, the legrest may further comprise a first handle coupled to the extendable footrest. The legrest may further comprise a first handle slot disposed in the legrest, the first handle slot at least partially defined by the legrest chassis and configured to accommodate the first handle, the first handle slot disposed in a first side of the legrest. The legrest may further comprise a top plate coupled to the legrest chassis, the first handle slot defined by the top plate and the legrest chassis. At least a portion of the extendable footrest may be located between the top plate and the legrest chassis. The legrest may further comprise a second handle slot disposed in a second side of the legrest and a second handle coupled to the extendable footrest, wherein the second handle is configured to move along the second handle slot, the extendable footrest configured to at least one of extend from and retract into the footrest opening in response to the second handle moving along the second handle slot. The legrest may further comprise a support arm pivotally coupled to the second end of the legrest, the support arm configured to provide a load bearing support for the legrest. The legrest may further comprise an attachment member located at the first end, wherein the legrest is configured to be coupled to a seat bottom of the stowable seat via the attachment member. The legrest may further comprise a cushion coupled to the top plate and the legrest chassis.

A legrest for a stowable seat is disclosed herein, in accordance with various embodiments. A legrest for a stowable seat may comprise a legrest chassis comprising a first end and a second end, the first end being located opposite the second end, a top plate coupled to the legrest chassis, a footrest opening disposed in the second end, and an extendable footrest configured to at least one of extend from and retract into the footrest opening, wherein the legrest is configured to be coupled to the stowable seat at the first end.

In various embodiments, the legrest may further comprise a handle coupled to the extendable footrest. The legrest may further comprise a handle slot disposed in the top plate configured to accommodate the handle for the extendable footrest. The handle slot may be disposed in the top plate at a midpoint between a first side of the legrest and a second side of the legrest. At least a portion of the extendable footrest may be located between the top plate and the legrest chassis. The legrest may further comprise a support arm pivotally coupled to the second end of the legrest, the support arm configured to provide a load bearing support for the legrest. The support arm may be coupled to the second end via a friction hinge configured to prevent the support arm from freely rotating. The legrest may further comprise an attachment member located at the first end, wherein the legrest is configured to be coupled to a seat bottom of the stowable seat via the attachment member. The legrest may further comprise a cushion coupled to the top plate, the cushion comprising an aperture through which the handle is accessible.

A method of manufacturing a footrest is disclosed herein, in accordance with various embodiments. A method of manufacturing a footrest may comprise placing a first footrest layer over an outer footrest layer, an inner surface of the first footrest layer facing away from the outer footrest layer, placing a second footrest layer over the outer footrest layer, an inner surface of the second footrest layer facing away from the outer footrest layer and a terminus of the first footrest layer adjacent to a corresponding terminus of the second footrest layer, folding a first side of the outer footrest layer over the inner surface of the first footrest layer and over the inner surface of the second footrest layer, the first side of the outer footrest layer covering the inner surface of the first footrest layer by a first dimension, folding a second side of the outer footrest layer over the inner surface of the first footrest layer and over the inner surface of the second footrest layer, the second side of the outer footrest layer covering the inner surface of the first footrest layer by a second dimension, placing a core footrest layer over the first footrest layer, and folding the second footrest layer over the core footrest layer such that the core footrest layer is sandwiched between the first footrest layer and the second footrest layer, wherein a width of the core footrest layer is less than a width of at least one of the first footrest layer and the second footrest layer by at least a sum of the first dimension and the second dimension.

In various embodiments, the method may further comprise positioning a stiffener into an aperture disposed in the core footrest layer.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3A illustrates a side vide of a stowable seat in a partially deployed position without a legrest attached to the seat bottom, in accordance with various embodiments;

FIG. 3B illustrates a side vide of a stowable seat in a partially deployed position with a legrest attached to the seat bottom, in accordance with various embodiments;

FIG. 4 illustrates a side view of a stowable seat in a fully deployed position with an extendable footrest in a fully extended position, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Regulatory requirements for aircraft, including Class III facility requirements stated in EU regulation ORO.FTL.205 (e)/CS.FTL.1.205(C), require a "Class 3 rest facility" (i.e., a seat in an aircraft cabin or flight crew compartment) to provide both "leg and foot support." Legrests for a stowable seat, as disclosed herein, satisfy these requirements, in accordance with various embodiments.

Figure 1:
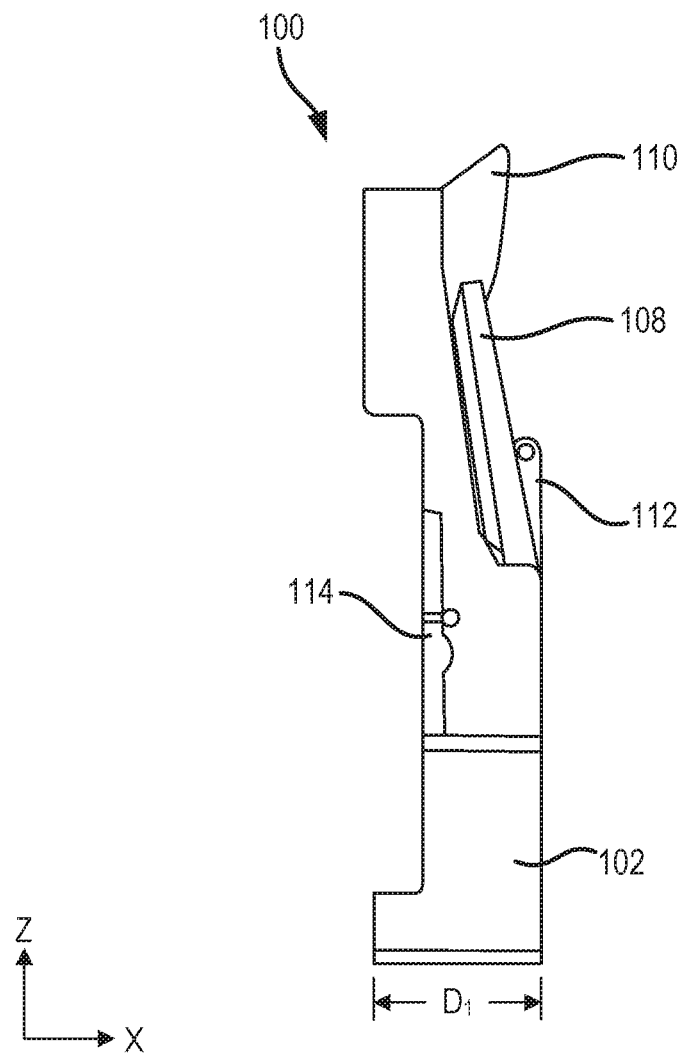
FIG. 1 illustrates a side view of a stowable seat in a stowed position, in accordance with various embodiments.
Figure 2:
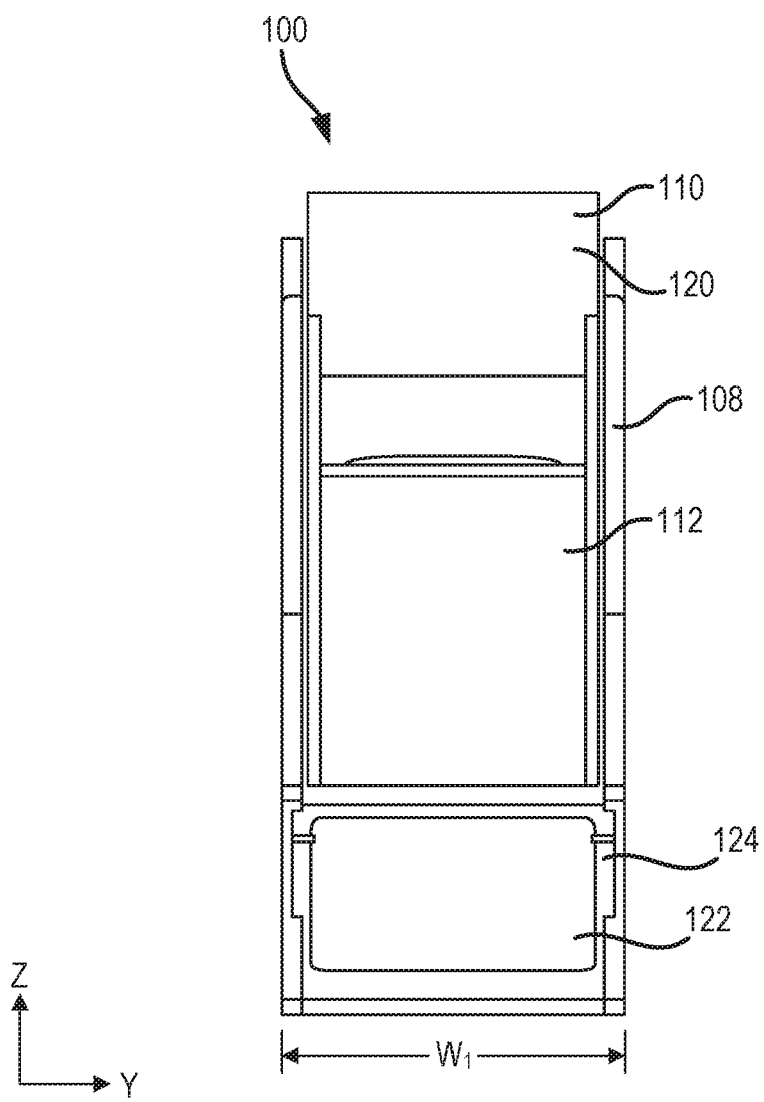
FIG. 2 illustrates a front view of a stowable seat in a stowed position, in accordance with various embodiments.

With reference to FIGS. 1 and 2, a stowable seat 100 is shown in a stowed position with back rest 110 and seat bottom 112 partially stored within housing 102. Xyz-axes are provided for ease of illustration. Housing 102 provides structural support and defines the depth D1 of the envelope of stowable seat 100 in a stowed position. Depth D1 may be less than 1 foot (30.5 cm). For example, the depth D1 of stowable seat 100 in a stowed position may be 11.5 inches (29.21 cm) at the base of housing 102. Feet may protrude downward from housing 102 of stowable seat 100 and provide a mounting point to mount stowable seat 100 to an aircraft floor, for example.

In various embodiments, arm rests 108 may be pivotally coupled to housing 102 such that arm rests 108 may pivot towards housing 102 into a stowed position. Seat back 110 may protrude vertically from housing 102 when stowable seat 100 is configured in a stowed position. Seat bottom 112 may pivot upward (i.e., in the positive z-direction) and towards seat back 110 so that seat bottom 112 is disposed at least partially in housing 102. Tray table 114 may store in a recess in housing 102. Tray table 114 may be removed from housing 102 and removably coupled to arm rests 108 to provide a working surface for an occupant of stowable seat 100.

In various embodiments, seat back 110 may include a cushion 120 facing outward from housing 102. A door 122 may open into a stow compartment 124. Width W1 may define a width of the envelope of stowable seat 100 configured in a stowed position. Width W1 may be approximately 20 inches (50.8 cm), for example. Stowable seat 100 in the stowed position may occupy less space than stowable seat 100 in a deployed position. In that regard, stowable seat 100 may be stowed to conserve useable volume in an aircraft or other application where space is limited.

With reference to FIG. 3A, a side vide of a stowable seat 100 is shown in a partially deployed position, in accordance with various embodiments. Seat bottom 112 may be pivotally coupled to housing 102 such that seat bottom 112 may fold away from housing 102. Cushion 130 of seat bottom 112 may be oriented to face upward (i.e., in the positive z-direction) in the partially deployed position. In the partially deployed position, seat bottom 112 may slide laterally outward from housing 102 along a track. Seat back 110 and arm rest 108 may also remain in the stowed position, however seat back 110 may also translate laterally as seat bottom 112 slides along a track until seat back 110 is oriented up to 30° from vertical, wherein the term "vertical", as used herein, refers to the z-direction. Stowable seat 100 in a partially deployed position may have a depth D2 of 27.8 inches (70.61 cm).

With reference to FIG. 3B, a side view of a stowable seat 100 is shown in a partially deployed position with a legrest 116 coupled to seat bottom 112, in accordance with various embodiments. A cushion 118 may be oriented to face upward in the partially deployed position. An extendable footrest 150 may extend from legrest 116.

With reference to FIG. 4, stowable seat 100 is shown in a fully deployed position with arm rest 108 deployed, support arm 140 deployed, legrest 116 attached, and footrest 150 fully extended, in accordance with various embodiments. Seat bottom 112 may slide along track 146 when stowable seat 100 is moved to the fully deployed position. Seat back 110 may be pivotally coupled to seat bottom 112.

In various embodiments, legrest 116 may be deployed by attaching legrest 116 to attachment point 126 of seat bottom 112. Support arm 140 may pivot down (i.e., in the negative z-direction) from legrest 116 to provide load bearing support for legrest 116. Support arm 140 may extend distance D4 from the back of housing 102. An end of footrest 150 may mark the widest point of the envelope of stowable seat 100 in a deployed position at a distance D3 from the back 104 of housing 102.

Seat back 110 may reach an angle greater than 40° from vertical. For example, seat back 110 may be oriented at 45° from vertical in a fully deployed position. Seat bottom 112 may be oriented at an angle from 3° to 15° (e.g., an angle of 5°) above horizontal to retain an occupant on seat bottom 112, wherein the term "horizontal", as used herein, refers to a direction in the xy-plane.

Figure 5A:
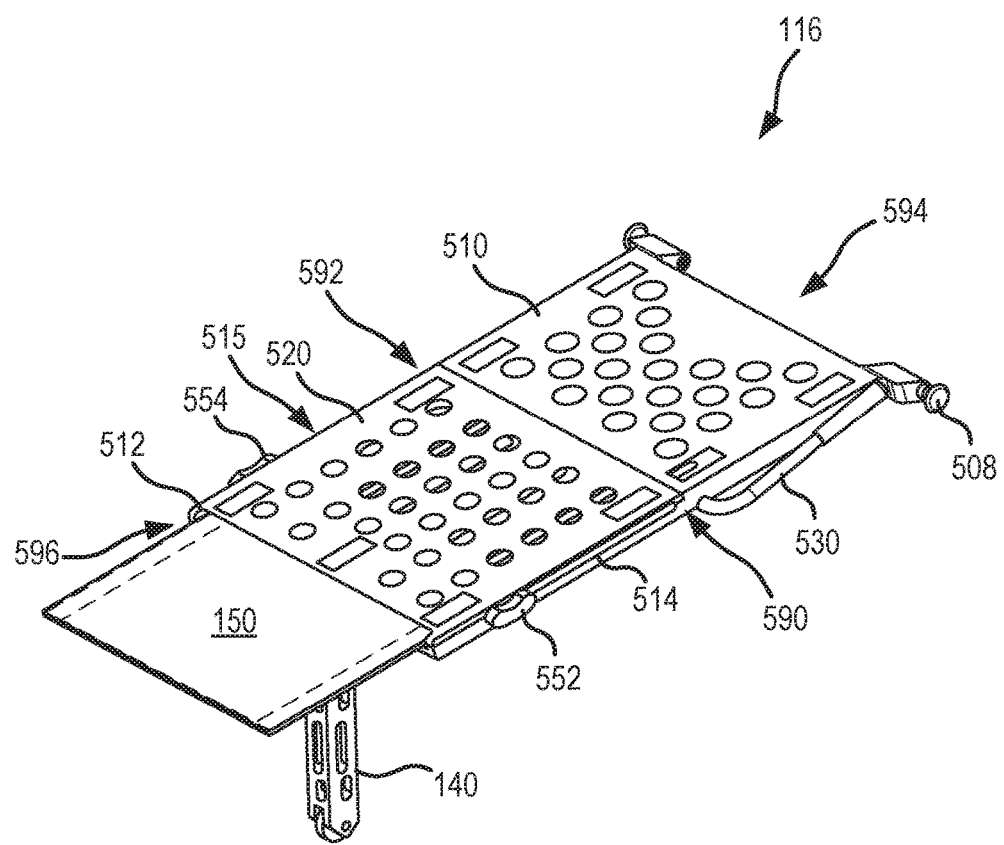
FIG. 5A illustrates a perspective view of a legrest with the cushion removed, the legrest having an extendable footrest in the fully extended position, in accordance with various embodiments.

With reference to FIG. 5A, legrest 116 is illustrated, with cushion 118 (see FIG. 4) removed, in accordance with various embodiments. Legrest 116 may comprise a first end 594 and a second end 596. Legrest 116 may comprise a first side 590 and a second side 592. Legrest 116 may comprise a chassis (also referred to herein as a legrest chassis) 510. Chassis 510 may comprise a substantially rectangular geometry. Legrest 116 may comprise attachment member 508. Legrest 116 may be coupled to attachment point 126 of seat bottom 112 via attachment member 508, with momentary additional reference to FIG. 4. Support arm 140 may extend from second end 596 of legrest 116. Legrest 116 may include a handle 530 operatively coupled to support arm 140. Support arm 140 may move to a deployed position in response to handle 530 being actuated. A top plate 520 may be coupled to chassis 510. Top plate 520 and chassis 510 may be flush. Cushion 118 may be coupled to top plate 520 and chassis 510, with momentary additional reference to FIG. 4. Top plate 520 and chassis 510 may define a plurality of openings or slots.

In various embodiments, a slot (also referred to herein as a first handle slot) 514 may be defined by top plate 520 and chassis 510. Slot 514 may be located on first side 590 of legrest 116. Slot 514 may be configured to accommodate sliding of footrest 150. Legrest 116 may include a handle (also referred to herein as a first handle) 552. Slot 514 may be configured to accommodate handle 552. In this regard, top plate 520 and chassis 510 may each comprise a cutout to accommodate handle 552, in accordance with various embodiments. A portion of footrest 150 may extend through slot 514 and be coupled to handle 552. Legrest 116 may include a handle (also referred to herein as a second handle) 554. Handle 554 may be similar to handle 552. In various embodiments, a slot (also referred to herein as a second handle slot) 515 (not visible in FIG. 5A) may be defined by top plate 520 and chassis 510. Slot 515 may be disposed in legrest 116 at second side 592. Slot 515 may be similar to slot 514.

Figure 5B:
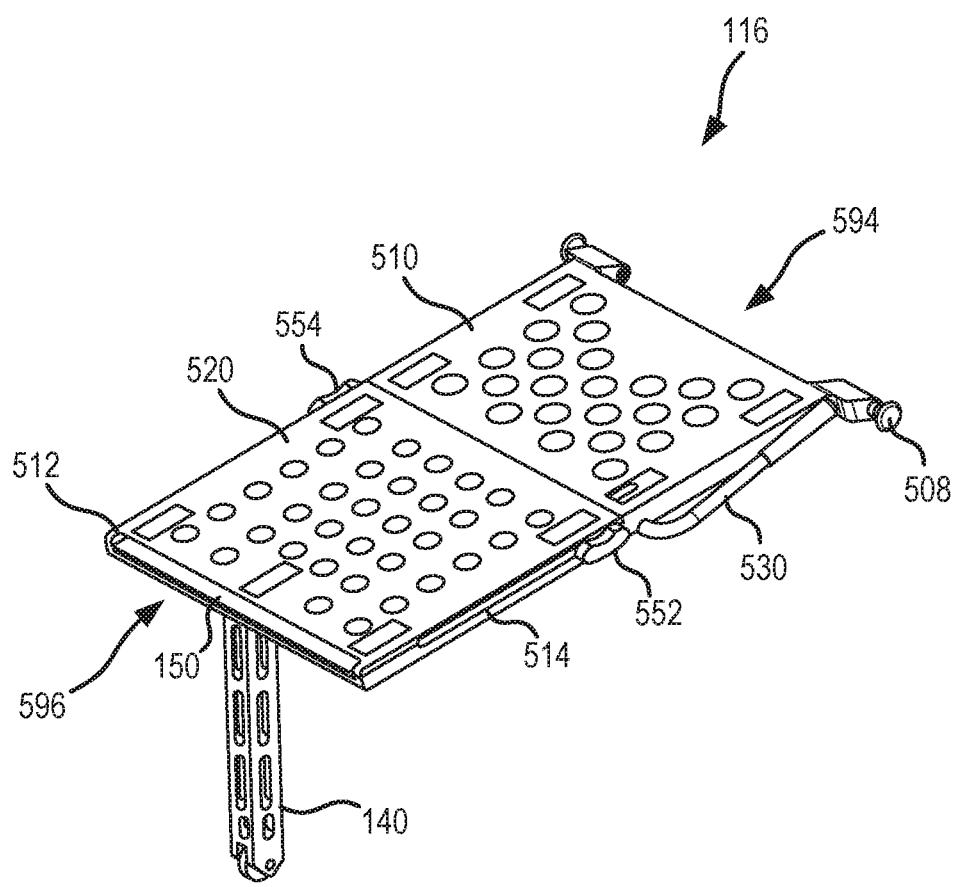
FIG. 5B illustrates a perspective view of a legrest with the cushion removed, the legrest having an extendable footrest in the fully retracted position, in accordance with various embodiments.

In various embodiments, an opening (also referred to herein as a footrest opening) 512 may be disposed in second end 596 of legrest 116. Opening 512 may be defined by top plate 520 and chassis 510. Footrest 150 may extend from opening 512. With momentary reference to FIG. 5B, footrest 150 is illustrated in the stowed position, in accordance with various embodiments. Footrest 150 may retract into opening 512. Footrest 150 may be located between top plate 520 and chassis 510. Footrest 150 may be moved to the stowed position by applying a force to handle 552 and/or handle 554 in the direction of first end 594. Conversely, footrest 150 may be moved to the deployed position by applying a force to handle 552 and/or handle 554 in the direction of second end 596.

Figure 5C:
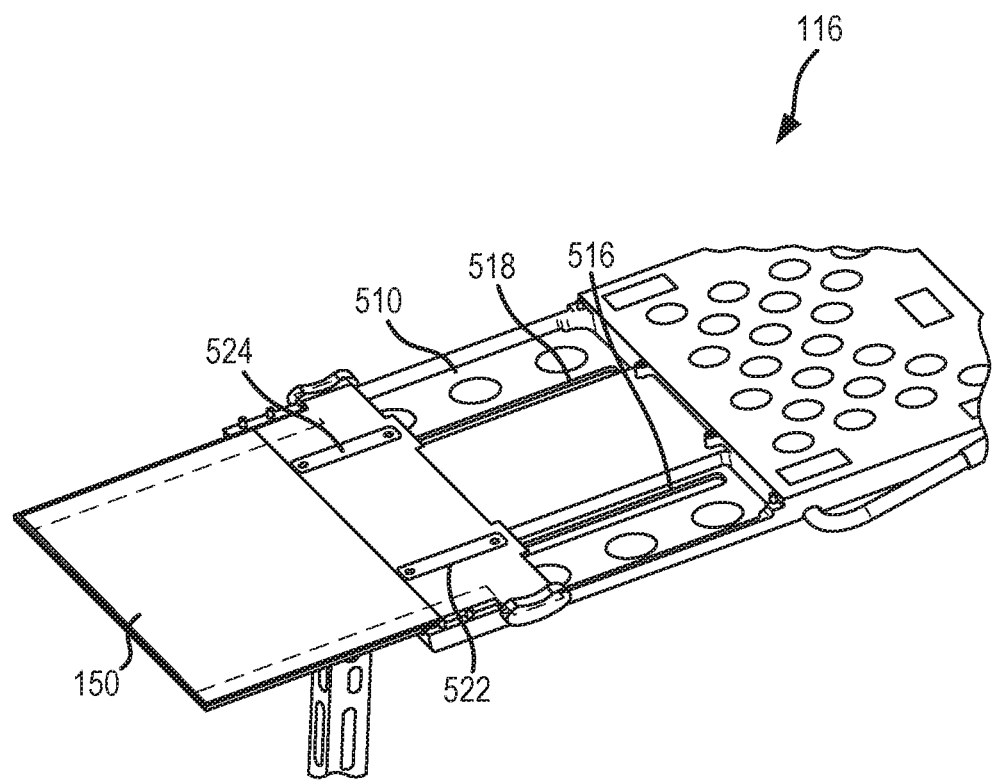
FIG. 5C illustrates a perspective view of a legrest with the cushion and the top plate removed, the legrest having an extendable footrest in the fully extended position, in accordance with various embodiments.
Figure 6A:
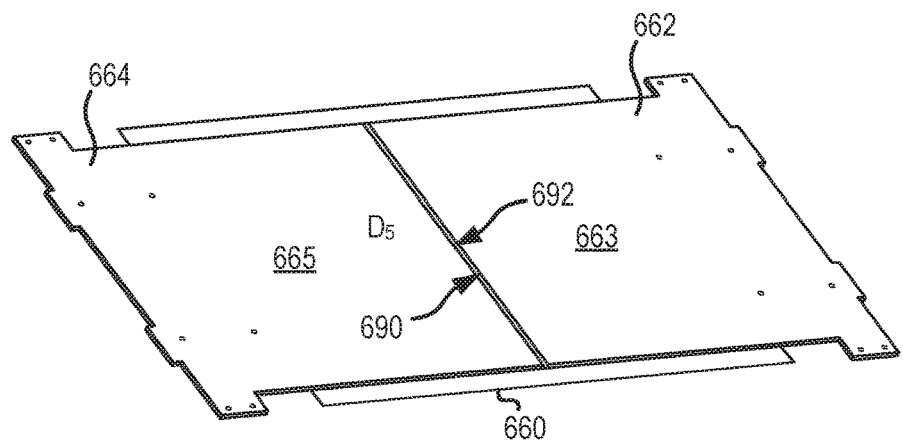
FIGS. 6A, 6B, 6C, 6D, and 6E illustrate a method for manufacturing a footrest, in accordance with various embodiments.
Figure 6B:
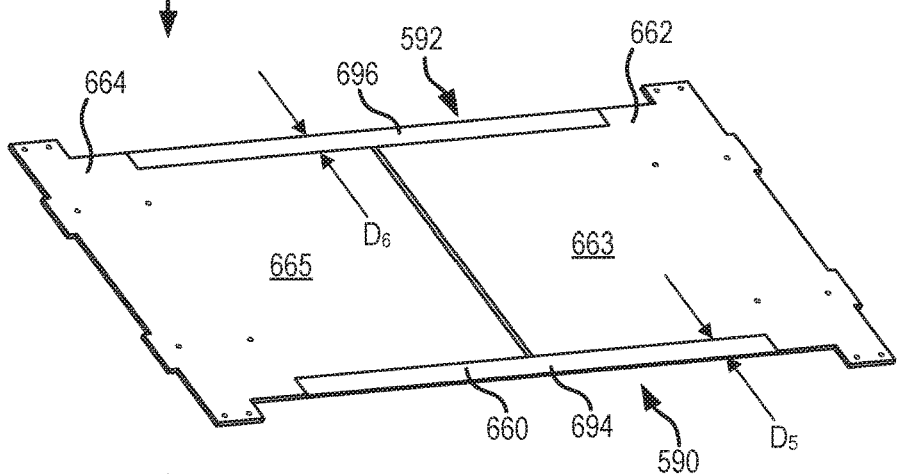
Figure 6C:
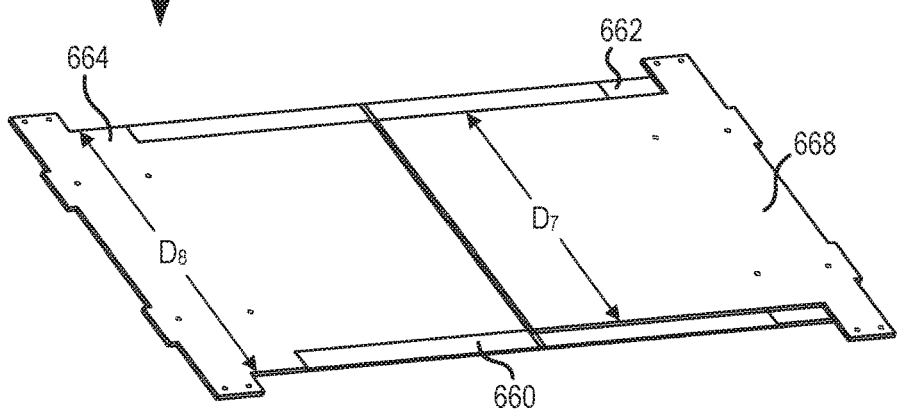
Figure 6D:
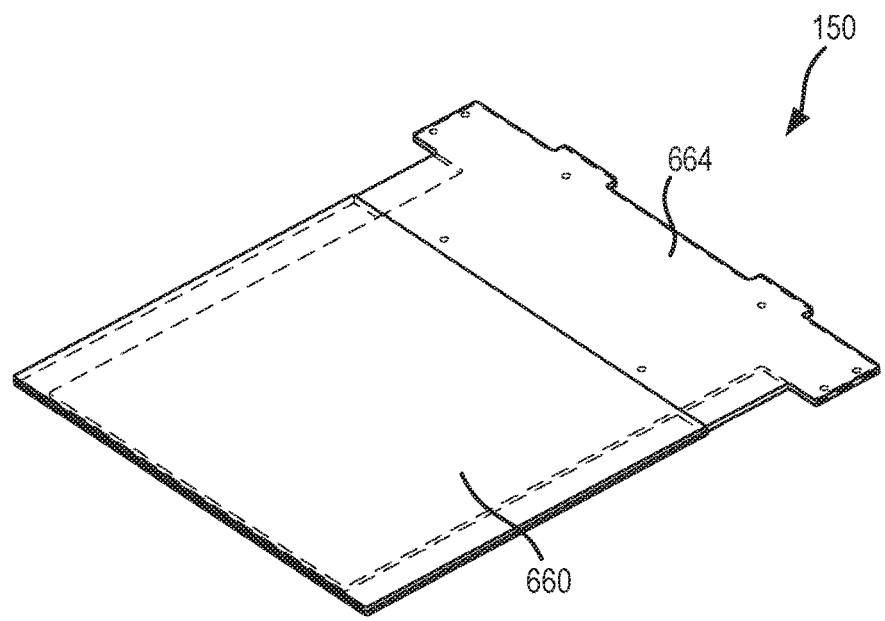
Figure 6E:
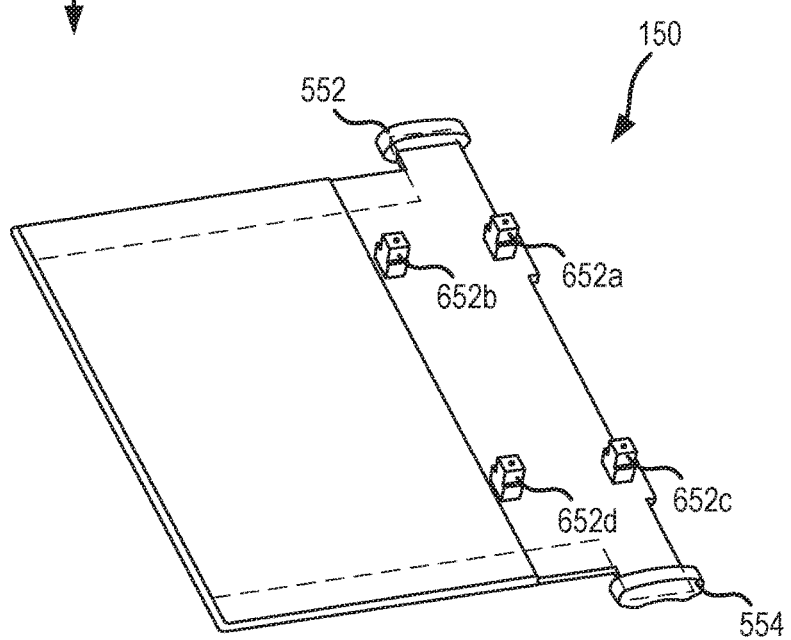

With reference to FIG. 5C, legrest 116 is illustrated with the top plate 520 removed for clarity purposes, in accordance with various embodiments. A first guide slot 516 and a second guide slot 518 may be disposed in chassis 510. With combined reference to FIG. 5C and FIG. 6E, guide 652a and guide 652b may translate within first guide slot 516 and guide 652c and guide 652d may translate within second guide slot 518. Guide 652a, guide 652b, guide 652c, and guide 652d may each comprise a boss extending from footrest 150. Guide 652a and guide 652b may be coupled to attachment plate 522 of footrest 150. Guide 652c and guide 652d may be coupled to attachment plate 524 of footrest 150.

With reference to FIGS. 6A through 6E, footrest 150 may comprise an outer footrest layer 660, a first footrest layer 662, a second footrest layer 664, and a core footrest layer 668. In various embodiments, outer footrest layer 660 may comprise natural or synthetic leather or a fabric. In various embodiments, first footrest layer 662, second footrest layer 664, and core footrest layer 668 may comprise a polycarbonate material.

Figure 9A:
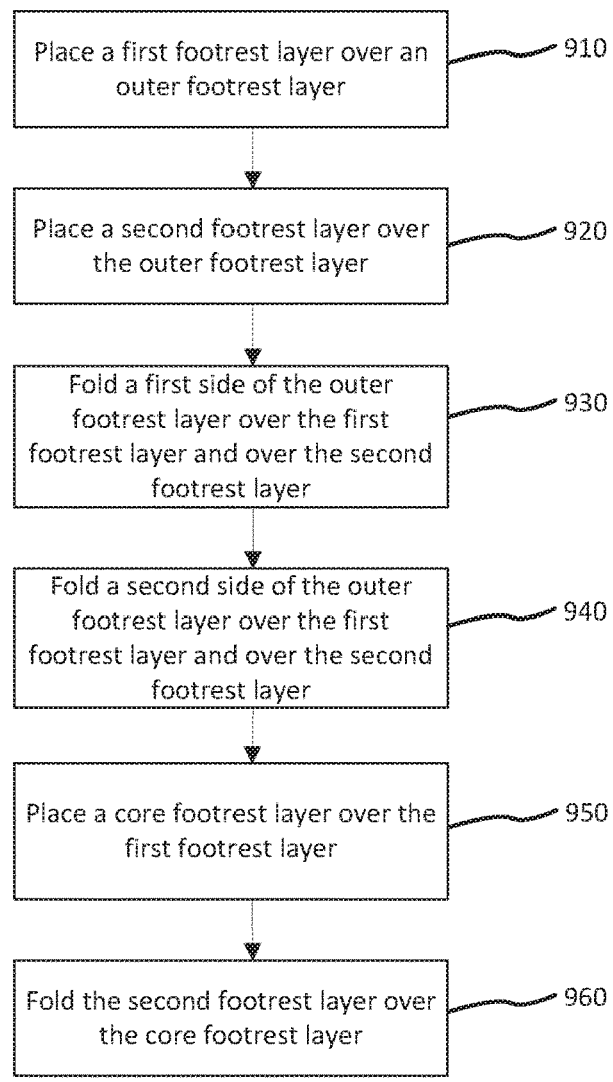
FIG. 9A illustrates a method for manufacturing a footrest, in accordance with various embodiments.

With reference to FIG. 9A, a method 900 for manufacturing a footrest is illustrated, in accordance with various embodiments. Method 900 may include placing a first footrest layer over an outer footrest layer (step 910). Method 900 may include placing a second footrest layer over the outer footrest layer (step 920). Method 900 may include folding a first side of the outer footrest layer over the first footrest layer and over the second footrest layer (step 930). Method 900 may include folding a second side of the outer footrest layer over the first footrest layer and over the second footrest layer (step 940). Method 900 may include placing a core footrest layer over the first footrest layer (step 950). Method 900 may include folding the second footrest layer over the core footrest layer (step 960).

With combined reference to FIGS. 6A-6E and FIG. 9A, step 910 may include placing first footrest layer 662 over outer footrest layer 660. Inner surface 663 of the first footrest layer 662 may be facing away from the outer footrest layer 660. Step 920 may include placing a second footrest layer 664 over the outer footrest layer 660. An inner surface 665 of the second footrest layer 664 may be facing away from the outer footrest layer 660. A terminus 690 of the first footrest layer 662 may be adjacent to a corresponding terminus 692 of the second footrest layer 664. Step 930 may include folding a first side 694 of the outer footrest layer 660 over the inner surface 663 of the first footrest layer 662 and over the inner surface 665 of the second footrest layer 664.

The first side 694 of the outer footrest layer 660 may cover the inner surface 663 and the inner surface 665 by a first dimension D5. The first side 694 may be glued to the inner surface 663 and inner surface 665. Step 940 may include folding a second side 696 of the outer footrest layer 660 over the inner surface 663 of the first footrest layer 662 and over the inner surface 665 of the second footrest layer 664. The second side 696 of the outer footrest layer 660 may cover the inner surface 663 and the inner surface 665 by a second dimension D6. The second side 696 may be glued to the inner surface 663 and inner surface 665. Step 950 may include placing a core footrest layer 668 over the first footrest layer 662. Step 960 may include folding the second footrest layer 664 over the core footrest layer 668 such that the core footrest layer 668 is sandwiched between the first footrest layer 662 and the second footrest layer 664. A width D7 of the core footrest layer 668 may be less than a width D8 of the first footrest layer 662 and/or the second footrest layer 664 by at least a sum of the first dimension D5 and the second dimension D6, to minimize the total thickness of footrest 150. In this manner, the total thickness of the footrest 150 may be no more than the thickness of the first footrest layer 662, the second footrest layer 664, the core footrest layer 668, and twice the thickness of the outer footrest layer 660.

Figure 9B:
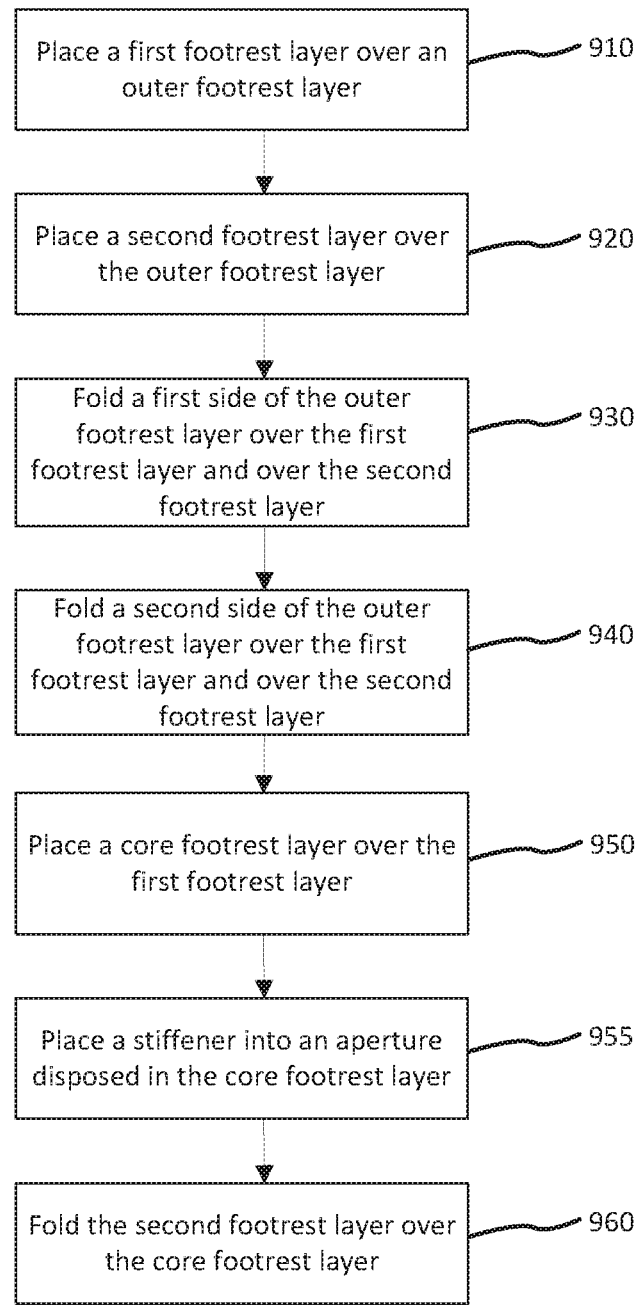
FIG. 9B illustrates a method for manufacturing a footrest, in accordance with various embodiments.

With reference to FIG. 9B, a method 901 for manufacturing a footrest is illustrated, in accordance with various embodiments. Method 901 may be similar to method 900 (see FIG. 9A), except that method 901 further includes placing a stiffener into an aperture disposed in the core footrest layer (step 955).

With combined reference to FIG. 8A and FIG. 9B, step 955 may include placing stiffeners 798 into aperture 769 of core footrest layer 768.

Figure 7A:
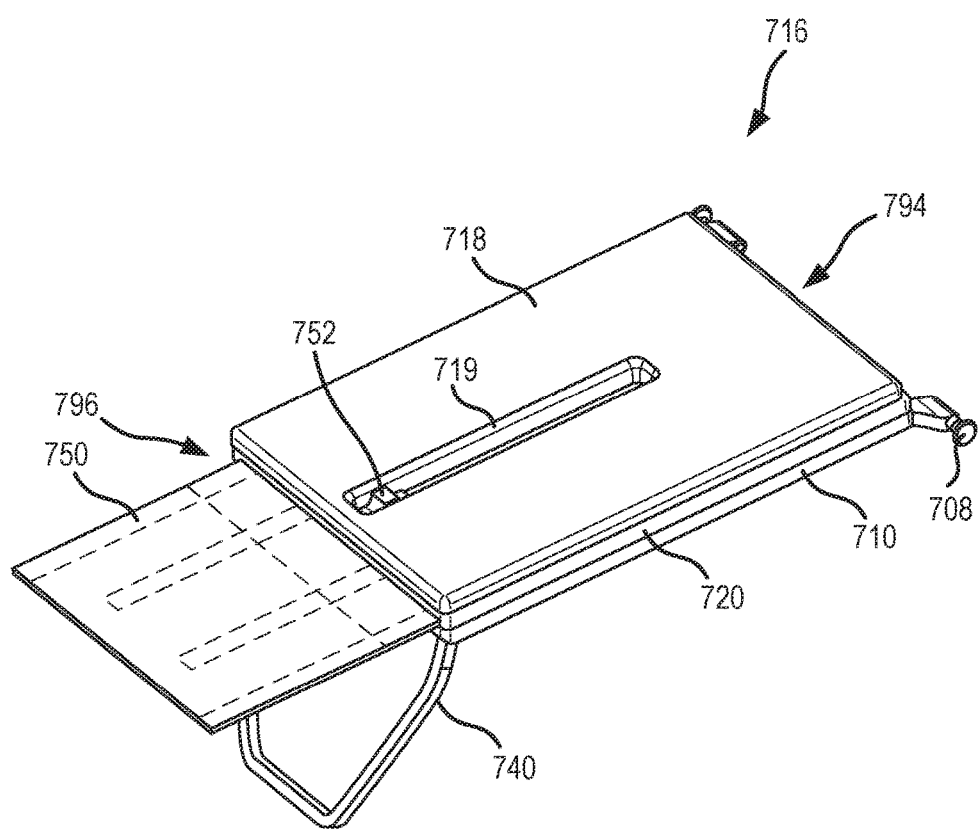
FIG. 7A illustrates a perspective view of a legrest having an extendable footrest in the fully extended position, in accordance with various embodiments.

With reference to FIG. 7A, a legrest 716 is illustrated, in accordance with various embodiments. Legrest 716 may be similar to legrest 116, with momentary additional reference to FIG. 5A. Legrest 716 may comprise an attachment member 708 at first side 794. Legrest 716 may comprise an extendable footrest 750 located at second side 796. A handle 752 may be coupled to footrest 750. Legrest 716 may comprise cushion 718. Cushion 718 may comprise an aperture 719 disposed in cushion 718. Legrest 716 may comprise chassis 710 and top plate 720.

Figure 7B:
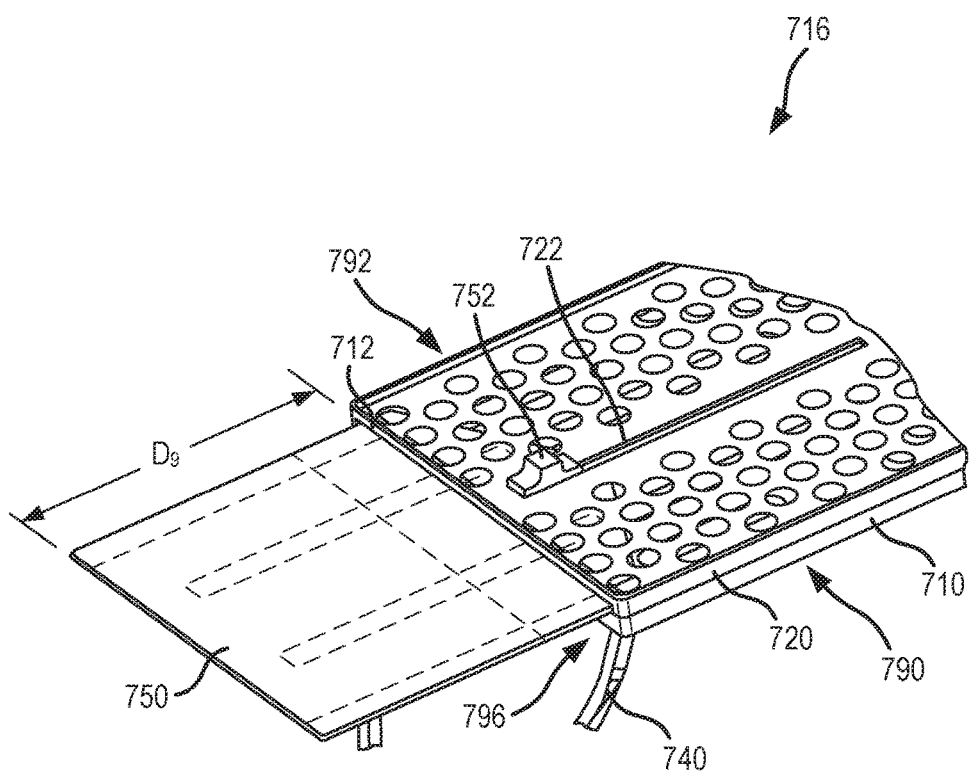
FIG. 7B illustrates a perspective view of a legrest with the cushion removed, the legrest having an extendable footrest in the fully extended position, in accordance with various embodiments.

With reference to FIG. 7B, legrest 716 is illustrated with cushion 718 removed for clarity purposes, in accordance with various embodiments. Top plate 720 may define a handle slot 722. Handle slot 722 may accommodate handle 752. Handle 752 may be configured to slide within handle slot 722. In various embodiments, handle slot 722 may be disposed at a midpoint between first side 790 and second side 792.

In various embodiments, footrest 750 may extend from second end 796 of legrest 716 by a distance D9. In various embodiments, footrest 750 may extend from second end 796 of legrest 716 by a distance D9 of between zero inches (0 cm), in a stowed position, and one foot (30.48 cm), in a fully deployed position. In various embodiments, footrest 750 may extend from second end 796 of legrest 716 by a distance D9 of five inches (12.7 cm), in a fully deployed position. In various embodiments, footrest 750 may extend from second end 796 of legrest 716 by a distance D9 of seven inches (17.78 cm), in a fully deployed position.

In various embodiments, an opening (also referred to herein as a footrest opening) 712 may be disposed in second end 796 of legrest 716. Opening 712 may be defined by top plate 720 and chassis 710. Footrest 750 may extend from opening 712. A support arm 740 may extend from chassis 710.

Figure 7C:
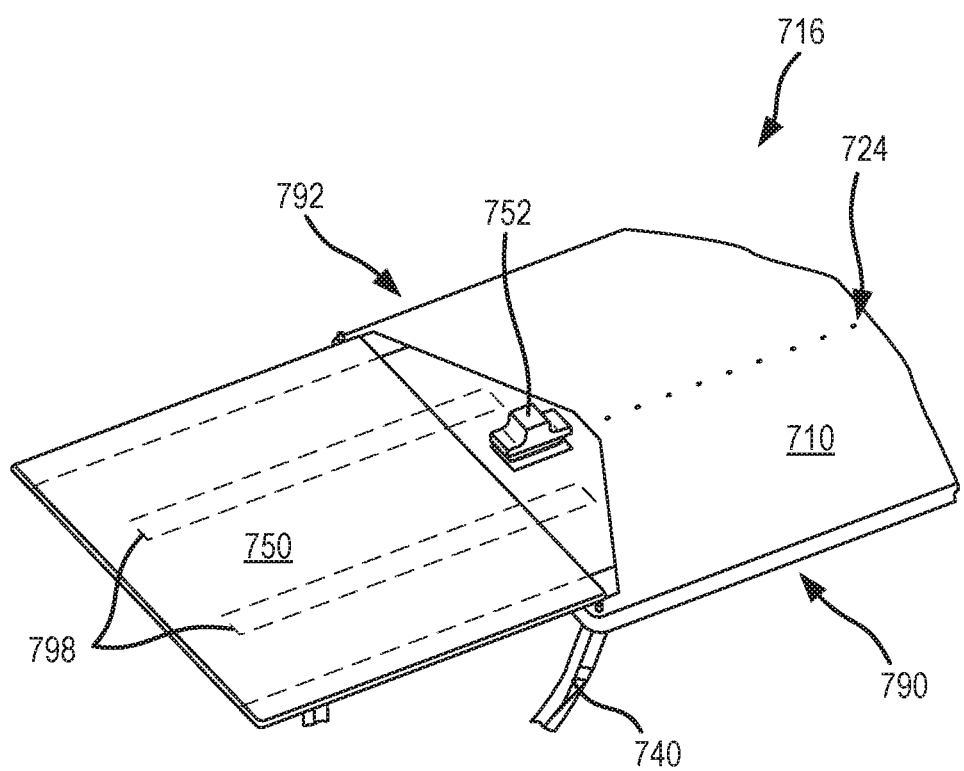
FIG. 7C illustrates a perspective view of a legrest with the cushion and the top plate removed, the legrest having an extendable footrest in the fully extended position, in accordance with various embodiments.

With reference to FIG. 7C, legrest 716 is illustrated with top plate 720 removed for clarity purposes, in accordance with various embodiments. Handle 752 may be coupled to footrest 750 at a midpoint between first side 790 and second side 792. Handle 752 may functionally serve as a handle, as well as a guide during translation of footrest 750. In this regard, handle 752 may engage handle slot 722 during extension and/or retraction of footrest 750, with momentary additional reference to FIG. 7B.

In various embodiments, footrest 750 may comprise stiffeners 798 located within footrest 750. Stiffeners 798 may comprise a metal alloy. Stiffeners 798 may prevent footrest 750 from bending.

Figure 7D:
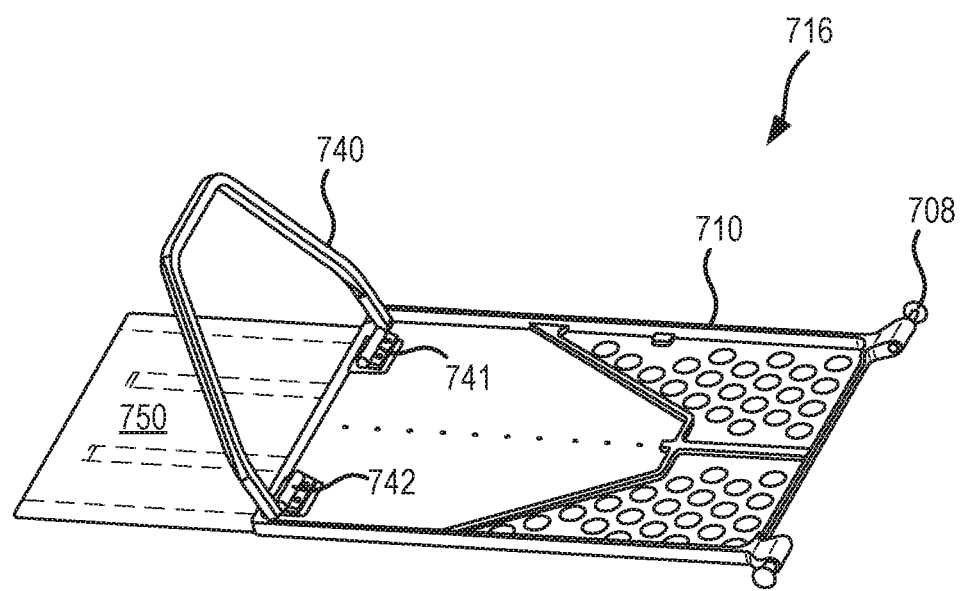
FIG. 7D illustrates a perspective view of a legrest with a support arm deployed, the support arm pivotally coupled to a chassis of the legrest via a first friction hinge and a second friction hinge, in accordance with various embodiments.

With reference to FIG. 7D, a bottom view of legrest 716 with top plate 720 removed is illustrated, in accordance with various embodiments. Support arm 740 may be coupled to chassis 710 via a first friction hinge 741 and a second friction hinge 742. First friction hinge 741 and a second friction hinge 742 may prevent support arm 740 from freely rotating about first friction hinge 741 and a second friction hinge 742. Support arm 740 may be deployed or stowed by applying a torque to support arm 740. Coupling support arm 740 to chassis 710 via first friction hinge 741 and a second friction hinge 742 may reduce part count and minimize the weight of legrest 716.

Figure 7E:
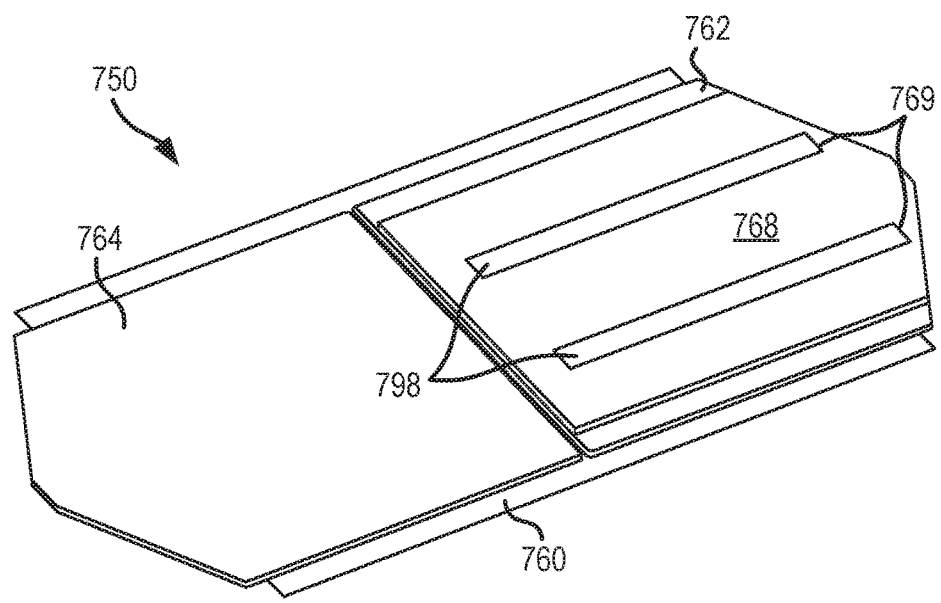
FIG. 7E illustrates a perspective view of a footrest during manufacture, prior to folding the outer footrest layer over the first footrest layer and the second footrest layer, the core footrest layer having apertures with stiffeners, in accordance with various embodiments.

With reference to FIG. 7E, footrest 750 during the manufacturing process is illustrated, in accordance with various embodiments. Footrest 750 may comprise a first footrest layer 762, a second footrest layer 764, a core footrest layer 768, and an outer footrest layer 760. Core footrest layer 768 may include apertures 769. Stiffeners 798 may be placed within apertures 769 during manufacture of footrest 750.

Figure 8:
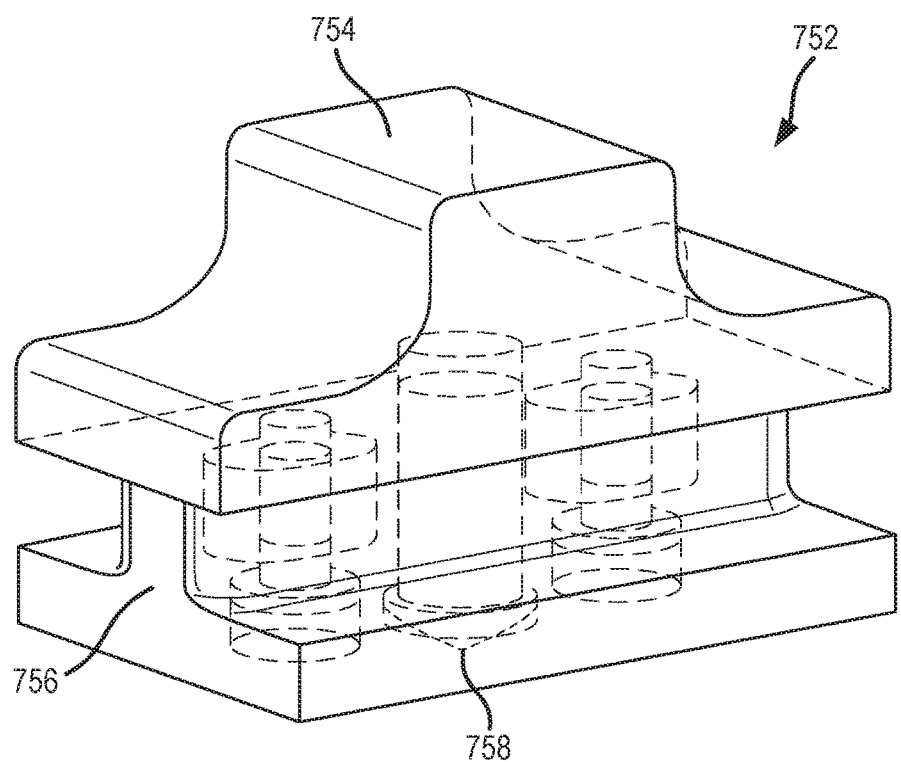
FIG. 8 illustrates a perspective view of a footrest handle having a detent, in accordance with various embodiments.

With reference to FIG. 8, handle 752 is illustrated, in accordance with various embodiments. Handle 752 may include a handle portion 754 and a base portion 756. Base portion 756 may be coupled to handle portion 754 via fasteners. A detent 758 may extend from base portion 756. Detent 758 may engage dimples 724 disposed in chassis 710, with momentary additional reference to FIG. 7C. Detent 758 may allow footrest 750 to be deployed at various positions.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A legrest for a stowable seat, comprising:
a legrest chassis comprising a first end and a second end, the first end being located opposite the second end;
a footrest opening disposed in the second end;
an extendable footrest moveable between a stowed position wherein the extendable footrest is retracted into the footrest opening and a deployed position wherein at least a portion of the extendable footrest extends from the footrest opening;
a first handle coupled to the extendable footrest, wherein the first handle translates with the extendable footrest between the stowed position and the deployed position; and
a first handle slot disposed in the legrest, the first handle slot at least partially defined by the legrest chassis and configured to accommodate the first handle,
wherein the first end of the legrest is configured to be coupled to the stowable seat.

2. The legrest of claim 1, wherein the first handle extends from the extendable footrest.

3. The legrest of claim 2, wherein the first handle slot is disposed on a first side of the legrest.

4. The legrest of claim 3, further comprising a top plate coupled to the legrest chassis, the first handle slot defined by the top plate and the legrest chassis.

5. The legrest of claim 4, wherein at least a portion of the extendable footrest is located between the top plate and the legrest chassis.

6. The legrest of claim 4, further comprising a cushion coupled to the top plate and the legrest chassis.

7. The legrest of claim 3, further comprising:
a second handle slot disposed in a second side of the legrest; and
a second handle coupled to the extendable footrest,
wherein the second handle is configured to move along the second handle slot, the extendable footrest configured to at least one of extend from and retract into the footrest opening in response to the second handle moving along the second handle slot.

8. The legrest of claim 1, further comprising a support arm pivotally coupled to the second end of the legrest, the support arm configured to provide a load bearing support for the legrest.

9. The legrest of claim 1, further comprising:
an attachment member located at the first end,
wherein the legrest is configured to be coupled to a seat bottom of the stowable seat via the attachment member.

10. A legrest for a stowable seat, comprising:
a legrest chassis comprising a first end and a second end, the first end being located opposite the second end;
a top plate coupled to the legrest chassis;
a footrest opening disposed in the second end; and
an extendable footrest moveable between a stowed position wherein the extendable footrest is retracted into the footrest opening and at least a portion of the extendable footrest is disposed between the top plate and the legrest chassis and a deployed position wherein at least a portion of the extendable footrest extends from the footrest opening,
wherein the legrest is configured to be coupled to the stowable seat at the first end.

11. The legrest of claim 10, further comprising a handle coupled to the extendable footrest.

12. The legrest of claim 11, further comprising a handle slot disposed in the top plate configured to accommodate the handle for the extendable footrest.

13. The legrest of claim 12, wherein the handle slot is disposed in the top plate at a midpoint between a first side of the legrest and a second side of the legrest.

14. The legrest of claim 12, wherein the extendable footrest translates with respect to the legrest chassis in response to moving between the stowed position and the deployed position.

15. The legrest of claim 12, further comprising a cushion coupled to the top plate, the cushion comprising an aperture through which the handle is accessible.

16. The legrest of claim 10, further comprising a support arm pivotally coupled to the second end of the legrest, the support arm configured to provide a load bearing support for the legrest.

17. The legrest of claim 16, wherein the support arm is coupled to the second end via a friction hinge configured to prevent the support arm from freely rotating.

18. The legrest of claim 10, further comprising:
an attachment member located at the first end,
wherein the legrest is configured to be coupled to a seat bottom of the stowable seat via the attachment member.

19. A method of manufacturing a footrest comprising:
placing a first footrest layer over an outer footrest layer, an inner surface of the first footrest layer facing away from the outer footrest layer;
placing a second footrest layer over the outer footrest layer, an inner surface of the second footrest layer facing away from the outer footrest layer and a terminus of the first footrest layer adjacent to a corresponding terminus of the second footrest layer;
folding a first side of the outer footrest layer over the inner surface of the first footrest layer and over the inner surface of the second footrest layer, the first side of the outer footrest layer covering the inner surface of the first footrest layer by a first dimension;
folding a second side of the outer footrest layer over the inner surface of the first footrest layer and over the inner surface of the second footrest layer, the second side of the outer footrest layer covering the inner surface of the first footrest layer by a second dimension;

placing a core footrest layer over the first footrest layer; and folding the second footrest layer over the core footrest layer such that the core footrest layer is sandwiched between the first footrest layer and the second footrest layer, wherein a width of the core footrest layer is less than a width of at least one of the first footrest layer and the second footrest layer by at least a sum of the first dimension and the second dimension.

20. The method of claim 19, further comprising:

positioning a stiffener into an aperture disposed in the core footrest layer.

* * * * *